(No Model.)
L. PENTZ.
REIN HOLDER.
No. 259,333. Patented June 13, 1882.
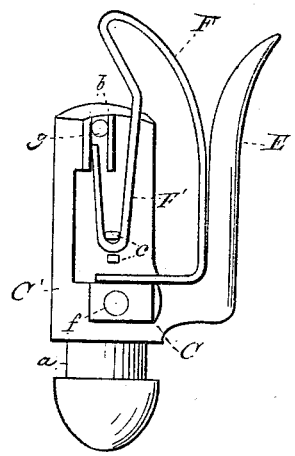
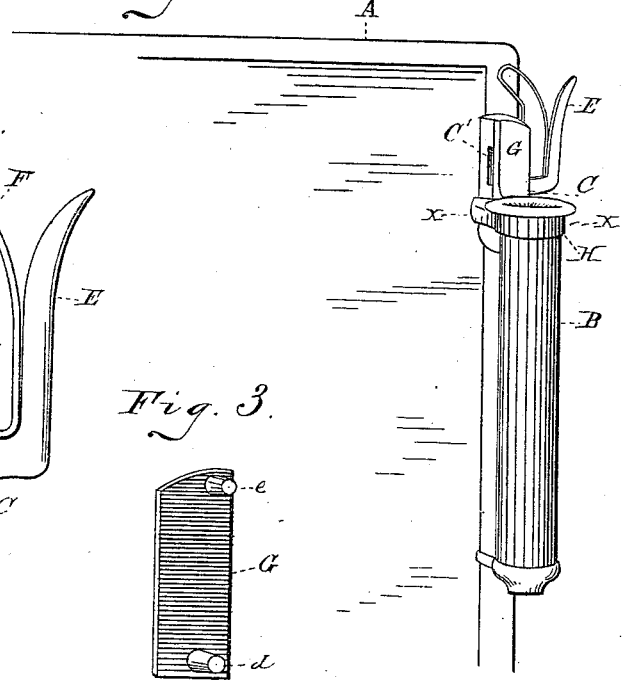
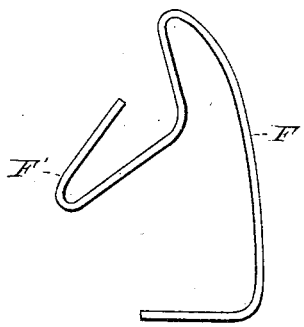
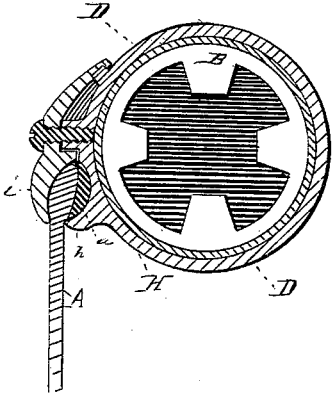
WITNESSES
INVENTOR
Levi Pentz
By Lazzell & Leggett
ATTORNEYS

UNITED STATES PATENT OFFICE.

LEVI PENTZ, OF CANTON, OHIO, ASSIGNOR TO CHARLES L. PAAR, HENRY W. WERTS, AND JOHN LAHM, OF SAME PLACE.

REIN-HOLDER.

SPECIFICATION forming part of Letters Patent No. 259,333, dated June 13, 1882.

Application filed February 6, 1882. (No model.)

*To all whom it may concern:*

Be it known that I, LEVI PENTZ, of Canton, in the county of Stark and State of Ohio, have invented certain new and useful Improvements in Rein-Holders; and I do hereby declare the following to be a full, clear, and exact description of the invention, such as will enable others skilled in the art to which it pertains to make and use the same.

My invention relates to rein-holders and a clamp for securing the same to the dash-board of a vehicle; and it consists in the peculiar construction of said rein-holder and clamp, as will be hereinafter fully set forth and claimed.

In the drawings, Figure 1 is a view showing my rein-holder in position on a dash-board. Fig. 2 is an enlarged view with part removed, showing more clearly the construction of my rein-holder. Figs. 3 and 4 are detached views of some of the parts. Fig. 5 is a cross-section taken through line $x\,x$, Fig. 1.

A is a dash-board of a vehicle.

B is a whip-socket.

C is a rein-holder constructed according to my invention.

D is a clamp for securing my rein-holder and also a whip-socket to the dash-board of a vehicle.

The construction of my rein-holder C is as follows:

C' is the body portion, and E is an arm extending out at a right angle to said body C', and then turning upward and running parallel to the same. Near the lower end of the body C', I provide a groove, $a$, into which one of the jaws of the clamp D fits.

F is a piece of spring-wire, which is formed as shown in Fig. 4, one of its ends, F', being bent U-shaped, so as to adapt it to fit between the lugs $b$ and $c$, which are formed on the body C'. The other end of wire F is turned at a right angle, and is left free to slide between the body C' and plate G. The plate G is provided with two pins, $d$ and $e$, which are cast or formed integral therewith. These two pins $d$ and $e$ fit into holes $f$ and $g$, and are riveted at their ends, and thus secure the plate G to the body C', which acts in turn to keep the spring F in place on said body C'. The upper part of the spring F is turned upon itself and curved in one direction, and the upper end of the arm E is also curved in the opposite direction, and thus a V-shaped opening is formed which allows of the reins being easily entered between the said spring F and arm E, and the spring F, pressing against the reins, acts to hold them tightly.

D is my clamp, which is formed as shown more clearly in Fig. 5, viz: H is a ring which surrounds the whip-socket B, said ring being provided with a jaw, $h$, and an adjustable jaw, $i$, both jaws being curved in such a manner that the opening between them will be shaped so as to snugly embrace the grooved end of the rein-holder and also the upright end of the frame of the dash-board, and thus hold the whip-socket and rein-holder in place in said dash-board.

What I claim is—

1. In a rein-holder, the combination, with a body-piece provided with outwardly-projecting lugs, and an arm arranged at one side of the body-piece and parallel therewith, of a spring one end of which is bent to engage with said lugs, while the remaining portion of said spring is bent upwardly, then downwardly upon itself, and finally inwardly to rest upon the body-piece, and a plate provided with projecting lugs which are adapted to enter perforations of the body-piece, substantially as set forth.

2. In a rein-holder, the combination, with a body-piece provided with lugs for engaging a spring, and with an arm arranged at one side of and parallel with said body-piece, of a spring secured at one end within said lugs, then extending upwardly, and then curved downwardly to form a V-shaped opening between said spring and arm to receive the reins, and a plate adapted to be secured to said body-piece, substantially as set forth.

In testimony whereof I have signed my name to this specification in the presence of two subscribing witnesses.

LEVI PENTZ.

Witnesses:
 JOHN LAHM,
 C. L. PAAR.